United States Patent [19]

Butuzov et al.

[11] 3,916,303
[45] Oct. 28, 1975

[54] METHOD FOR CHECKING THE QUALITY OF A PIEZOELECTRIC MATERIAL

[76] Inventors: Vladimir Petrovich Butuzov, Sirenevy bulvar, 45, kv. 55; Lev Alexeevich Ljubimov, ulitsa Krasny Kazanets, 19, korpus 2, kv. 190; Anatoly Alexandrovich Shaposhnikov, 5 Vatuninsky pereulok, 31, kv. 10, all of Moscow; Lev Nikolaevich Romanov, ulitsa Revoljutsii, 40, kv. 45; Svetlana Vasilievna Kolodieva, ulitsa Krasnoi Molodezhi, 4, kv. 41, both of Alexandrov Vladimirskoi oblasti; Anatoly Andreevich Fotchenkov, ulitsa Lenina, 24, kv. 26, Alexandrov Vladimirskoi oblasti; Mikhail Iosifovich Yaroslavsky, Baikalskaya ulitsa, 30, korpus 2, kv. 44, Moscow; Valentin Evstafievich Khadzhi, ulitsa Institutskaya, 14, kv. 8; Mikhail Ivanovich Golikov, ulitsa Tereshkovoi, 2, kv. 51, both of Alexandrov Vladimirskoi oblasti, all of U.S.S.R.

[22] Filed: Feb. 11, 1974

[21] Appl. No.: 441,509

[52] U.S. Cl. ................................. 324/56
[51] Int. Cl.² ............................ G01R 29/22
[58] Field of Search ..................... 324/56, 13

[56] References Cited
UNITED STATES PATENTS

| | | | |
|---|---|---|---|
| 2,733,405 | 1/1956 | Gerber | 324/56 |
| 2,976,604 | 3/1961 | Kosowsky | 324/56 X |
| 3,230,448 | 1/1966 | Norrelgen | 324/56 X |
| 3,490,036 | 1/1970 | Grenier | 324/56 |
| 3,593,125 | 7/1971 | Wilhelm | 324/56 |

*Primary Examiner*—Gerard R. Strecker
*Attorney, Agent, or Firm*—Haseltine, Lake & Waters

[57] ABSTRACT

A method for checking the quality of a piezoelectric material, wherein the frequency of the dielectric loss angle tangent maximum, from which the quality of the piezoelectric material is estimated, is found from the temperature-frequency dependence of the dielectric loss angle tangent of the piezoelectric material.

3 Claims, 3 Drawing Figures

METHOD FOR CHECKING THE QUALITY OF A PIEZOELECTRIC MATERIAL

The present invention relates to piezoelectric techniques, and more particularly to a method for checking the quality of a piezoelectric material.

Known in the art are methods for checking the quality of a piezoelectric material, based on determining a parameter characterizing the quality of this material and necessitating samples made from the material with a high-quality surface finish.

A major disadvantage inherent in the prior art methods resides in the necessity to prepare such samples, which is time-consuming and costly.

Another disadvantage is the lack of objectivity in determining the parameter characterizing the quality of the piezoelectric material, which is due to the impossibility of preparing absolutely identical samples as far as their surface finish quality is concerned.

Still another disadvantage is the irreproducibility of the results of checking a single sample, which is due to the high sensitivity of the sample surface to the ambient atmosphere.

Another method for checking the quality of a piezoelectric material is known which is free of the above disadvantages.

In this method, the temperature-frequency dependence of the tangent of the dielectric loss angle of the piezoelectric material is measured with one of the parameters (frequency) being invariable, then the other parameter (temperature), at which the value of the dielectric loss angle tangent is maximum (TM), is found from the above dependence, from which the quality of the piezoelectric material is determined.

This method, however, suffers from a disadvantage residing in the long duration of the checking procedure under preset temperature conditions, for to determine $T_m$ each sample has to be heated within a wide temperature range.

It is an object of the present invention to provide a method for checking the quality of a piezoelectric material, which will make it possible to rapidly, accurately and objectively determine a parameter characterizing the quality of the material.

With this and other ojects in view, the invention is directed at providing a method for checking the quality of a piezoelectric material, based on measuring the temperature-frequency dependence of the tangent of the dielectric loss angle of the piezoelectric material with one of the parameters being invariable, and finding, from this dependence, the other parameter at which the value of the dielectric loss angle tangent is maximum, the latter parameter being used to determine the parameter characterizing the quality of the piezoelectric material, in which, according to the invention, the parameter at which the value of the dielectric loss angle tangent is maximum is frequency, temperature serving as the invariable parameter.

The choice of the frequency of the maximum tangent of the dielectric loss angle as a parameter characterizing the quality of a piezoelectric material is based on the fact that the inventors have found a relationship to exist between the frequency of the tan $\delta$ maximum and Q-factor of a piezoelectric material. A similar relationship has been found to exist between the frequency of the tan $\delta$ maximum and the piezoelectric modulus of the piezoelectric material.

On the basis of this relationship, it is expedient to measure the frequency dependence of the tangent of the dielectric loss angle of said piezoelectric material at a constant temperature, and to find, from this dependence, the frequency at which the value of the dielectric loss angle tangent is maximum, and determine the Q-factor of said material from this frequency.

It is also expedient to measure the frequency dependence of the tangent of the dielectric loss angle of the piezoelectric material at a constant temperature, and to find, from this dependence, the frequency at which the value of the dielectric loss angle tangent is maximum, and determine the piezoelectric modulus of said material from this frequency.

The proposed method for checking the quality of a piezoelectric material permits rapid, accurate and objective determination of the quality of the piezoelectric material.

The invention will now be described in greater detail with reference to preferred embodiments thereof taken in conjunction with the accompanying drawings, wherein.

Consider now the proposed method for checking the quality of a piezoelectric material, in this case, piezoquartz. As is well known, the parameter characterizing the quality of piezoquartz is its Q-factor.

To check the quality of piezoquartz, samples are sawn out in the required quantity from the crystal which is most representative of a given group of crystals, which samples are then polished or machined by any appropriate known means; use may also be made of rough samples or solid crystals without sawing them to pieces.

The herein disclosed method for checking the quality of a piezoelectric material consists in the following.

A piezoquartz sample held in a holder is placed into a thermostat in which a constant temperature is maintained throughout the check. Such an arrangement is conventional, as for example, in "Effect of a Nonstructural Impurity on the Migration and Relaxation of Base Ions in Quartz" by S. V. Kolodiev, A. A. Fotchenko, "Electronical Engineering", "Radio Components" Series, 1970. v.6. p. 117 (in Russian). Then, by using the known bridge substitution method, measurements are taken of tan $\delta$ within a range, of frequencies and the results of the measurements are displayed in the form of a graph representing tan $\delta$ versus $f$ (FIG. I).

A solid crystal of piezoquartz is also fixed in a holder and placed in a thermostat for tan $\delta$ to be measured by the known bridge substitution method within a range of frequencies. The graph representing the frequency dependence of tan $\delta$ for a solid crystal is shown in FIG. I (Curve I), the frequency $f$ of the maximum of tan $\delta$ being dissimilar for different piezoquartz crystals.

Figure 1:
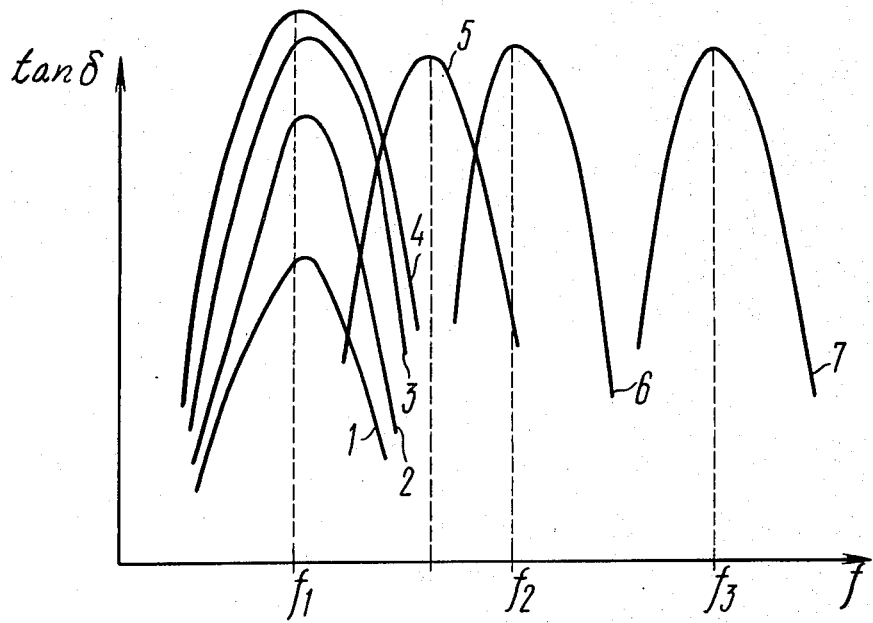
FIG. 1 is a graph illustrating the frequency dependence of tan $\delta$ for various samples as well as a solid crystal of a piezoelectric material, according to the invention.

Curves 2, 3, 4 and 5 in FIG. 1 are used to denote the frequency dependences of tan δ for samples cut across the axis Z of this crystal with, respectively, a rough surface (curve 2), a ground surface (curve 3), a polished surface (curve 4), as well as for samples cut out at an angle to the axis Z (curve 5). It can be seen from the graph of FIG. 1 (curves 1–5) that neither the quality of surface finish, nor the shape and size of a sample affect the frequency $f_1$ of the maximum of tan δ, and, when checking the quality of piezoquartz on samples cut out in any other direction, it is only the value of the frequency $f$ of the maximum of tan δ that varies. Curves 6 and 7 represent the frequency dependences of tan δ for ground samples cut out from other crystals of piezoquartz. Here $f_2$ and $f_3$ are the respective frequencies of the maxima of tan δ for these samples.

Found from the graph representing the frequency dependence of tan δ is the frequency $f_m$ of the maximum of tan δ, which frequency is then used to determine the Q-factor of piezoquartz, the Q-factor being, as has been mentioned above, the parameter characterizing the quality of piezoquartz. The Q-factor is determined on a graph $Q(f_m)$ plotted in advance for calibration purposes. The method of plotting the calibrated graph $Q(f_m)$ is based on the relationship established by the applicants between the frequency $f_m$ of the maximum of tan δ and the quality Q of the crystal and consisting as follows.

Figure 2:
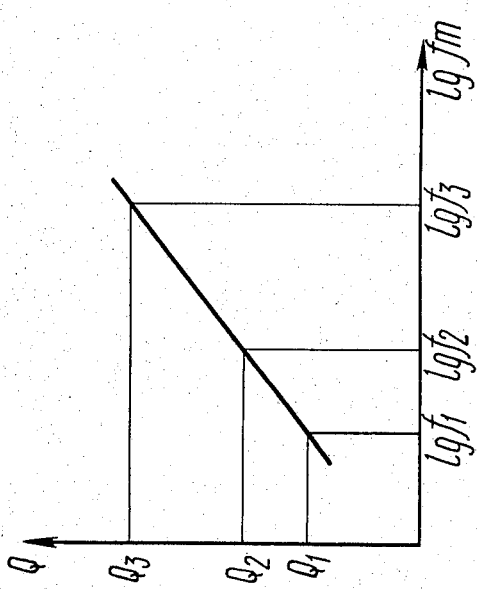
FIG. 2 is a calibration graph for determining a parameter characterizing the quality of the piezoelectric material from the frequency of the maximum of tan $\delta$ according to the invention.

Piezoquartz crystals are selected with Q-factors within a broad range of values and the required number of samples are prepared from each crystal in the form of biconvex lenses used as piezoelements and having a basic frequency of 1 mHz, as well as samples cut out across the axis Z of the crystal known as Z-cut samples. Used as such samples may be solid crystals of piezoquartz. Determined on Z-cut samples or a solid crystal is the frequency $f_m$ of the maximum of tan δ and the logarithms of the obtained values averaged for the samples of each crystal are plotted on the abscissa. Plotted as ordinates are the values of Q-factor also averaged for all the lenses of each crystal. The plotted points are joined by a line. The values of the frequency $f_m$ of the maximum of tan δ and respective values of the parameter characterizing the quality of the piezielectric material (Q-gactor) may also be summarized both in tables and in nomographic charts. It can be inferred from FIG. 2 that for crystals with the frequencies $f_1 < f_2 < f_3$ of the maxima of tan δ, the values of the Q-factors are $Q_1 < Q_2 < Q_3$, respectively.

Figure 3:
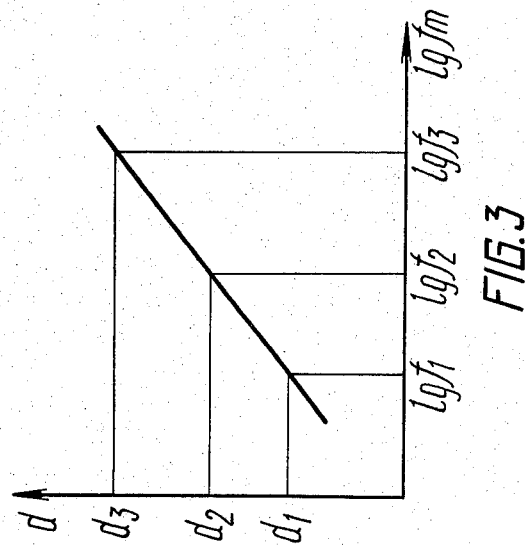
FIG. 3 is a calibration graph for determining another parameter characterizing the quality of the piezoelectric material from the frequency of the maximum of tan $\delta$ according to the invention.

When a piezoquartz crystal is used in piezielectric devices, the basic parameter characterizing its quality is the piezoelectric modulus $d$ the dependence of which on the frequency of the dielectric loss tangent maximum is represented in FIG. 3, which frequency is determined in the abovedescribed manner.

Samples from other piezoelectric materials (piezoceramics, ferroelectrics) are analyzed in a similar manner if these materials have electrically active impurity centers.

The proposed method for checking the quality of a piezoelectric material may be advantageously used in piezoelectric technology and applied both to natural and artificially grown piezoquartz and other piezoelectric materials.

An advantage of the proposed method is that the results of checking are unaffected by the surface finish quality, shape or size of samples, which ensures the objectivity and reproducibility of these results.

The simplicity of preparing samples and the possibility to dispense with checking under preset temperature conditions substantially cuts down the time required to check the quality of a piezoelectric material.

Another advantage of the proposed method is the possibility of checking the quality of artificially grown pizocrystals with a thin layer built up along the axis Z.

Still another advantage of the proposed method is the high accuracy of measuring the parameters of a solid piezocrystal from which piezoelements will be made, which permits dispensing with further correction of these parameters on finished products.

What is claimed is:

1. A method of checking the quality of a piezoelectric material comprising the steps of determining the quantitative relationship between the frequency of the maximum of the tangent of the dielectric loss angle at invariable temperature and a parameter characterizing the quality of the piezoelectric material; measuring the frequency of the maximum of the tangent of the dielectric loss angle of the piezoelectric material being checked at invariable temperature, and determining, on the basis of said frequency in the above relationship, the parameter characterizing the quality of the piezoelectric material.

2. A method of checking the quality of a piezoelectric material, comprising the steps of determining the quantitative relationship between the frequency of the maximum of the tangent of the dielectric loss angle at invariable temperature and the Q-factor of the piezoelectric material; measuring the frequency of the maximum of the tangent of the dielectric loss angle of the piezoelectric material being checked at invariable temperature, and determining, on the basis of said frequency in said relationship, the Q-factor of the piezoelectric material.

3. A method of checking the quality of a piezoelectric material, comprising the steps of determining the quantitative relationship between the frequency of the maximum of the tangent of the dielectric loss angle at invariable temperature and the piezoelectric modulus of the piezoelectric material; measuring the frequency of the maximum of the tangent of the dielectric loss angle of the piezoelectric material being checked at invariable temperature, and determining, on the basis of said frequency in said relationship, the piezoelectric modulus of the piezoelectric material.

* * * * *